UNITED STATES PATENT OFFICE.

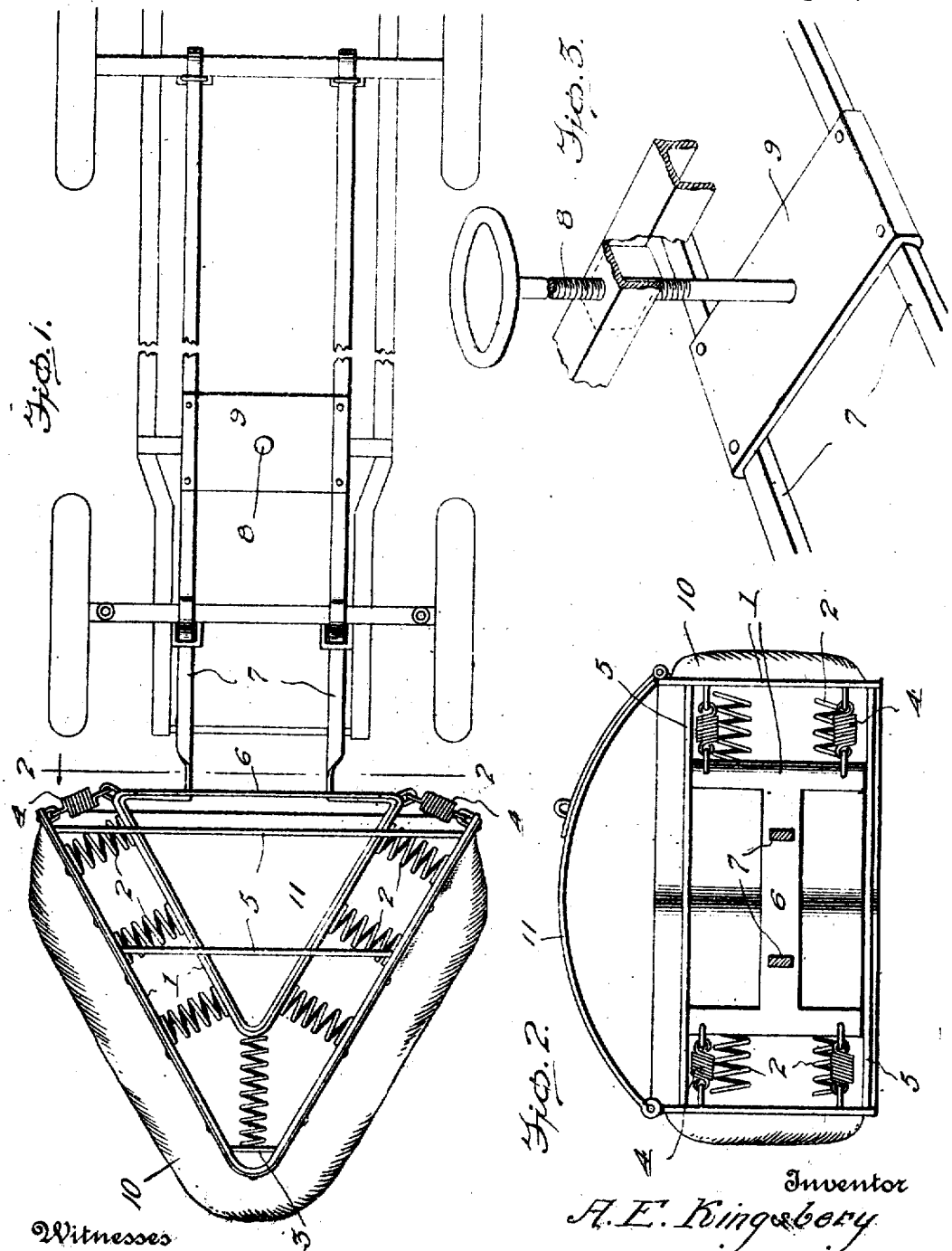

ALBERT E. KINGSBERY, OF MEMPHIS, TENNESSEE.

AUTO-FENDER.

1,261,552.

Specification of Letters Patent.

Patented Apr. 2, 1918.

Application filed December 8, 1917. Serial No. 206,262.

*To all whom it may concern:*

Be it known that I, ALBERT E. KINGSBERY, a citizen of the United States, residing at Memphis, in the county of Shelby and State of Tennessee, have invented new and useful Improvements in Auto-Fenders, of which the following is a specification.

This invention relates to new and useful improvements in fenders for automobiles, street-cars and other vehicles, and the principal object of the invention is to provide a fender provided with springs for absorbing the jar or shock, when in contact with an obstacle, and to provide a cushion for preventing the injury of the person struck by the fender.

Another object of the invention is to provide a novel form of supporting means for the fender and a novel arrangement of springs for absorbing the shock.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a bottom view of an automobile provided with my improved fender.

Fig. 2 is a cross section on line 2—2 of Fig. 1.

Fig. 3 is a detail view of the adjusting means for the fender.

In these views the fender is shown as connected with an automobile though it will be understood that the fender may be secured to a street-car or any other vehicle. As shown the fender consists of a pair of V-shaped frames 1, one frame being placed within the other and the outer frame being of much larger dimensions than the inner one so as to leave a space between the frames. 2 indicates a series of coil springs located between the frames and having their ends secured thereto in any desired manner. As will be seen the springs are located between the sides of the frames and a set between the pointed ends of the frames. If desired I may place a strip 3 adjacent the pointed end of the outer frame to receive the ends of these springs. The springs act as cushioning means for permitting the outer frame to have movement in relation to the inner frame and I connect the ends of said frames together by tension springs 4. As shown these springs are located at the rear ends of the frames and the drawing shows a pair of these springs placed at each side of the frames. 5 are brace bars connecting the sides of the outer frame together and located above and below the inner frame, said inner frame being made of less height than the outer frame. The rear ends of the inner frame are connected together by a bar 6 and to this bar are connected the supporting bars 7. These supporting bars are connected to any suitable part of the vehicle, as shown said bars are connected at their rear ends to the rear axle and are also suitably connected to the front part of the running gear of the automobile. I provide means for adjusting the distance of the fender from the ground or street and such means consists of a screw member 8 having its lower end connected with a brace plate 9 connected with the supporting bars and its other end provided with a handle which is connected with a part of the chassis. Thus it will be seen that by turning the handle the fender may be raised or lowered. The outer frame is provided with a suitable cushion as indicated at 10 so as to prevent injury to a person struck by the fender and I also prefer to cover the space between said outer frame by means of a hinged top 11 suitably hinged to one side of the outer member and having fastening means on the other side for securing said top in closed position.

It will thus be seen that when the fender strikes an obstruction the cushioning springs will absorb the shock thus preventing injury to the automobile. The tension springs will cause the parts to assume their normal position.

It is thought from the foregoing description that the advantages and novel features of my invention will be readily apparent.

I desire it to be understood that I may make slight changes in the construction and in the combination and arrangement of the several parts, provided that such changes fall within the scope of the appended claim.

What I claim is:—

A device of the class described comprising a pair of V-shaped frames, cushioning springs located between the frames and securing them together, tension springs connecting the rear ends of said frames together, a cushion carried by the outer frame, and adjustable means for connecting said fender with the vehicle.

In testimony whereof I affix my signature.

ALBERT E. KINGSBERY.